United States Patent Office 2,785,171
Patented Mar. 12, 1957

2,785,171

1-PHENYL- AND 1-(P-CHLOROPHENYL)-1-(2-PYRIDYL) - 3 - DIMETHYLAMINOPROPANE N-OXIDES

Robert D. Birkenmeyer, Kalamazoo Township, Kalamazoo County, Mich., assignor to The Upjohn Company, Kalamazoo, Mich., a corporation of Michigan No Drawing. Application August 16, 1955,
Serial No. 528,817

4 Claims. (Cl. 260—296)

This invention relates to new organic compounds and is particularly directed to 1-phenyl- and 1-(p-chlorophenyl) - 1 - (2 - pyridyl) - 3 - dimethylaminopropane N-oxides either as the free bases or as acid addition salts thereof.

It is an object of the invention to provide novel physiologically active compounds. It is a further object to provide novel antihistaminics. It is a further object to provide novel compounds which are safe and effective for this purpose and have a higher therapeutic index than the corresponding tertiary amine.

These and other objects are accomplished in the novel compounds of the invention which are represented by the following basic formula:

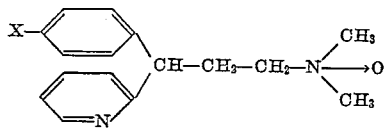

wherein X is hydrogen or chlorine, and can exist and can be used for the purposes of the invention in the form of the free bases or acid addition salts thereof with a pharmacologically acceptable acid such as hydrochloric, hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

*Example 1. — 1 - phenyl - 1 - (2 - pyridyl) - 3 - dimethylaminopropane N-oxide free base*

In a 500-milliliter, one-necked flask cooled in an ice bath were placed 25 grams (0.104 mole) of 1-phenyl-1-(2-pyridyl)-3-dimethylaminopropane free base and 24.2 grams of thirty percent hydrogen peroxide solution. Absolute ethanol was then added until the opaque solution became clear (about twenty milliliters of absolute ethanol were required). This solution was allowed to stand at 25 degrees centigrade for 24 hours and then again placed in an ice bath while destroying any excess hydrogen peroxide by the addition of 200-milligram portions of platinum oxide catalyst. The reaction mixture was then filtered and the filtrate distilled under vacuum at a pot temperature of less than 35 degrees centigrade until all the ethanol and water were removed. The desired product, 1-phenyl-1-(2-pyridyl)-3-dimethylaminopropane N-oxide free base, was thus obtained as a clear, viscous, amber oil.

*Example 2.—1 - phenyl - 1 - (2 - pyridyl) - 3 - dimethylaminopropane N-oxide maleate*

The clear, viscous, amber oil obtained in Example 1 was dissolved in the minimum amount of absolute ethanol, diluted with one liter of dry ether, and an ethereal solution of maleic acid was then added. The 1-phenyl-1-(2-pyridyl)-3-dimethylaminopropane N-oxide maleate which precipitated was collected and recrystallized twice from alcohol-ether, melting point 114.5–114.8 degrees centigrade.

*Analysis.*—Calcd. for $C_{20}H_{24}N_2O_5$: C, 64.49; H, 6.49; N, 7.52. Found: C, 64.59; H, 6.61; N, 7.51.

By substituting 1 - (p - chlorophenyl) - 1 - (2 - pyridyl)-3-dimethylaminopropane for the 1-phenyl-1-(2-pyridyl)-3-dimethylaminopropane of Example 1, there are obtained, by following the procedures of Examples 1 and 2, 1-(p-chlorophenyl)-1-(2-pyridyl)-3-dimethylaminopropane N-oxide free base and the maleate thereof.

In place of maleic acid there may be substituted appropriate acids to obtain the hydrobromide, the hydrochloride, the hydroiodide, the sulfate, the phosphate, the nitrate, the acetate, the benzoate, the salicylate, the glycolate, the succinate, the nicotinate, the tartrate, the maleate, the lactate, and the like.

The novel compounds of this invention can be used for the same purposes and in the same dosage forms, such as tablets, injectables, and elixirs, as 1-phenyl- and 1 - (p - chlorophenyl) - 1 - (2 - pyridyl) - 3 - dimethylaminopropane and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound selected from the class consisting of 1-phenyl- and 1-(p-chlorophenyl)-1-(2-pyridyl)-3-di 1 - phenyl - and 1 - (p - chlorophenyl) - 1 - (2 - pyridyl)-3-dimethylaminopropane N-oxide free bases and the acid addition salts thereof with a pharmacologically acceptable acid.

2. A compound selected from the class consisting of 1 - phenyl - and 1 - (p - chlorophenyl) - 1 - (2 - pyridyl)-3-dimethylaminopropane N-oxide free bases.

3. The acid addition salt of a pharmacologically acceptable acid and a compound selected from the class consisting of 1-phenyl- and 1-(p-chlorophenyl)-1-(2-pyridyl)-3-dimethylaminopropane N-oxides.

4. 1 - phenyl - 1 - (2 - pyridyl) - 3 - dimethylaminopropane N-oxide maleate.

No references cited.